US007650143B2

(12) United States Patent
Jagadeesan et al.

(10) Patent No.: US 7,650,143 B2
(45) Date of Patent: Jan. 19, 2010

(54) SYSTEM AND METHOD FOR OFFERING SEAMLESS CONNECTIVITY ACROSS MULTIPLE DEVICES IN A COMMUNICATIONS ENVIRONMENT (75) Inventors: Ramanathan T. Jagadeesan, San Jose, CA (US); Bich T. Nguyen, Los Altos, CA (US); Mark Grayson, Cary, NC (US); Eric Hamel, Paris (FR)

(73) Assignee: Cisco Technology, Inc., San Jose, CA (US)

(*) Notice: Subject to any disclaimer, the term of this patent is extended or adjusted under 35 U.S.C. 154(b) by 353 days.

(21) Appl. No.: 11/128,046

(22) Filed: May 11, 2005

(65) Prior Publication Data

US 2006/0256751 A1 Nov. 16, 2006

(51) Int. Cl.
*H04M 3/42* (2006.01)
(52) U.S. Cl. ............ 455/417; 455/435.1; 455/436; 455/438; 709/227
(58) Field of Classification Search .......... 455/435.1, 455/436–444, 450, 453, 509, 510, 517, 417; 370/331–333; 709/227; 379/211.01, 212.01
See application file for complete search history.

(56) References Cited

U.S. PATENT DOCUMENTS

| 5,577,029 | A |   | 11/1996 | Lu et al. ............ 370/54 |
| 5,754,945 | A | * | 5/1998  | Lin et al. ............ 455/436 |
| 5,887,256 | A |   | 3/1999  | Lu et al. ............ 455/426 |
| 5,943,332 | A |   | 8/1999  | Liu et al. ............ 370/342 |
| 6,002,679 | A |   | 12/1999 | Liu et al. ............ 370/335 |
| 6,016,318 | A |   | 1/2000  | Tomoike ............ 370/401 |
| 6,061,337 | A | * | 5/2000  | Light et al. ............ 370/331 |
| 6,141,545 | A |   | 10/2000 | Begeja et al. ............ 455/417 |
| 6,181,928 | B1 |  | 1/2001  | Moon ............ 455/415 |
| 6,405,040 | B1 |  | 6/2002  | Liu et al. ............ 455/435 |
| 6,411,632 | B2 |  | 6/2002  | Lindgren et al. ............ 370/466 |
| 6,539,237 | B1 |  | 3/2003  | Sayers et al. ............ 455/555 |
| 6,546,425 | B1 |  | 4/2003  | Hanson et al. ............ 709/227 |
| 6,611,689 | B1 |  | 8/2003  | Cartigny et al. ............ 455/461 |
| 6,647,426 | B2 |  | 11/2003 | Mohammed ............ 709/238 |
| 6,687,360 | B2 |  | 2/2004  | Kung et al. ............ 379/211.02 |

(Continued)

OTHER PUBLICATIONS

J. Rosenberg, "A Session Initiation Protocol (SIP) Event Package for Registrations," Network Working Group, RFC 3680, 22 pgs., Mar. 2004.

(Continued)

*Primary Examiner*—Patrick N Edouard
*Assistant Examiner*—Anthony S Addy
(74) *Attorney, Agent, or Firm*—Baker Botts L.L.P.

(57) ABSTRACT

An apparatus for providing connectivity is provided that includes a mobility server operable to coordinate a communication session between a first and a second end-user device. The first end-user device is associated with a first call leg and the second end-user device is associated with a second call leg. A handoff is executed in transferring the communication session from the first end-user device to the second end-user device. In more particular embodiments, the mobility server is operable to receive signal strength information from the first end-user device and to execute the handoff based on the signal strength information. In addition, the handoff is executed based on an end-user preference that is provided in a subscription that is accessed by the mobility server.

31 Claims, 2 Drawing Sheets

U.S. PATENT DOCUMENTS

| | | | |
|---|---|---|---|
| 6,708,041 B1 * | 3/2004 | Butovitsch et al. | 455/522 |
| 6,748,054 B1 | 6/2004 | Gross et al. | 379/88.12 |
| 6,771,953 B1 | 8/2004 | Chow et al. | 455/417 |
| 6,807,431 B2 | 10/2004 | Sayers et al. | 455/555 |
| 6,826,173 B1 | 11/2004 | Kung et al. | 370/352 |
| 6,888,808 B2 | 5/2005 | Jagadeesan et al. | 370/328 |
| 6,961,559 B1 | 11/2005 | Chow et al. | 455/414.1 |
| 7,133,677 B2 * | 11/2006 | Feder et al. | 455/443 |
| 7,191,233 B2 * | 3/2007 | Miller | 709/227 |
| 7,400,886 B2 * | 7/2008 | Sahim et al. | 455/444 |
| 2001/0046214 A1 | 11/2001 | Kang | 370/328 |
| 2003/0134638 A1 | 7/2003 | Sundar et al. | 455/435 |
| 2003/0134650 A1 | 7/2003 | Sundar et al. | 455/465 |
| 2003/0224795 A1 | 12/2003 | Wilhoite et al. | 455/445 |
| 2004/0037324 A1 | 2/2004 | Heubel et al. | 370/493 |
| 2004/0068567 A1 * | 4/2004 | Moran et al. | 709/227 |
| 2004/0087307 A1 | 5/2004 | Ibe et al. | 455/436 |
| 2004/0127208 A1 | 7/2004 | Nair et al. | 455/420 |
| 2004/0146021 A1 | 7/2004 | Fors et al. | 370/331 |
| 2004/0205191 A1 * | 10/2004 | Smith et al. | 709/227 |
| 2004/0259546 A1 * | 12/2004 | Balachandran et al. | 455/435.2 |
| 2004/0266426 A1 | 12/2004 | Marsh et al. | 455/426.2 |
| 2005/0227724 A1 * | 10/2005 | Tsai | 455/525 |

OTHER PUBLICATIONS

M. Garcia-Martin, E. Henrikson, and D. Mills, "Private Header (P-Header) Extensions to the Session Initiation Protocol (SIP) for the 3rd-Generation Partnership Project (3GPP)," Network Working Group, RFC 3455, 29 pgs., Jan. 2003.

Global System for Mobile Communications, "3rd Generation Partnership Project; Technical Specification Group Services and System Aspects; Report on alternative architectures for combining CS Bearers with IMS; Release 6," http://www.3gpp.org, 28 pgs., 2004.

* cited by examiner

SYSTEM AND METHOD FOR OFFERING SEAMLESS CONNECTIVITY ACROSS MULTIPLE DEVICES IN A COMMUNICATIONS ENVIRONMENT

TECHNICAL FIELD OF THE INVENTION

The present invention relates generally to communications and, more particularly, to a system and a method for offering seamless connectivity across multiple devices in a communications environment.

BACKGROUND OF THE INVENTION

Networking architectures have grown increasingly complex in communications environments. In recent years, a series of protocols and architectures have been developed in order to accommodate a diverse group of end users having various needs. Some of these protocols relate to issues associated with dynamically changing connectivity.

As both public and private network systems grow in size and in sophistication, proper routing and efficient management of communication sessions and data flows becomes even more critical. In cases where protocols are unable to accommodate a given service, device, or feature, an end user is precluded from enjoying the benefits of a given component or a network. Advances in technology have resulted in the deployment of various types of wireless networks. However, while most of these wireless networks often provide service to adjacent and/or overlapping physical spaces through the use of proprietary handover techniques, most cellular and Internet Protocol (IP) network protocols are incompatible. Moreover, an end user is somewhat encumbered or confined in existing architectures because optimum connectivity does not exist across a wide array of consumer devices. Accordingly, the ability to provide an effective mechanism to properly process and direct communications for an end user seeking to realize the benefits provided by multiple network environments and by a plethora of devices offers a significant challenge to network operators, component manufacturers, and system designers.

SUMMARY OF THE INVENTION

In accordance with some of the teachings of the present invention, techniques for providing optimal connectivity support are offered in the context of achieving an effective dynamic connectivity between a plurality of devices across a plurality of networks. According to some embodiments, these techniques enable an end user to maintain an uninterrupted communication session that can be readily switched between devices and/or networks. In particular, these techniques can allow an end user to manage or to execute a call across a given set of end-user devices.

According to a particular embodiment, an apparatus for providing connectivity is provided that includes a mobility server operable to coordinate a communication session between a first and a second end-user device. The first end-user device is associated with a first call leg and the second end-user device is associated with a second call leg. The mobility server is operable to optimally manage the call legs including session bi-casting across multiple legs or leg transfer. A leg transfer is executed in transferring the communication session from the first end-user device to the second end-user device.

In more particular embodiments, the mobility server is operable to receive signal strength information from the first and second end-user devices and to execute the communication leg transfer based on the signal strength information. In addition, the communication leg transfer is executed based on an end-user preference that is provided in a subscription that is accessed by the mobility server and may be supplemented by receiving additional preference information from the first or second end-user device.

Embodiments of the invention provide various technical advantages. For example, the architecture of the present invention provides improved flexibility for an end user, who can employ various devices to facilitate a given session. The present invention also offers a solution that allows a user to be provided with service continuity as the user switches access networks.

Moreover, the present invention puts the core message routing functionality within the network (and not with the client). Such an optimization further allows the operator to control the transition between devices and between access networks. It should also be noted that such an architecture is equally compatible with access solutions that combine the use an Internet Protocol (IP) and circuit switched technology for transporting end-to-end voice transport (e.g. 3GPP 23.899 logic).

Certain technical advantages of the present invention may be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
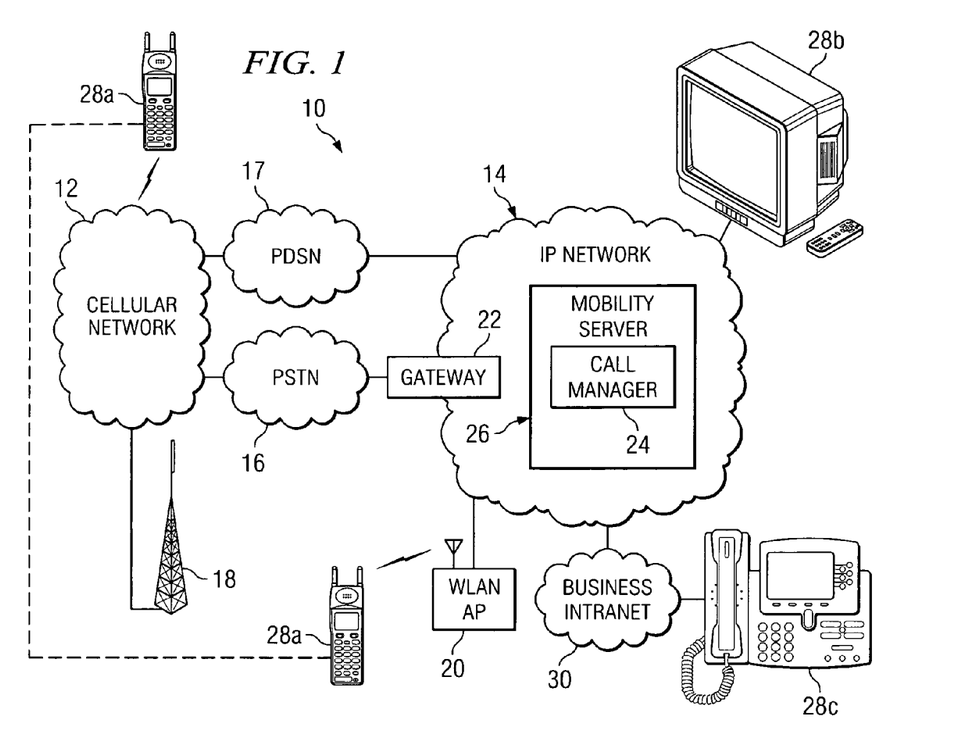
FIG. 1 is a simplified block diagram that illustrates a communication system having multiple end-user devices that support a dynamic communication leg management between various networks.

FIG. 1 is a simplified block diagram that illustrates a communication system 10 for providing signal strength communication support for potential communication leg transfer in a network environment. Communication system 10 comprises a cellular network 12 and an Internet Protocol (IP) network 14, which are interconnected through a public switched telephone network (PSTN) 16. Note that there is IP connectivity between cellular network 12 and ID network 14. One or more base stations 18 are coupled to cellular network 12. IP network 14 can be coupled to cellular network 12 via a packet data serving node (PDSN) 17. IP network 14 includes a gateway 22, a Call Manager 24 (that is manufactured by Cisco Systems, Inc. of San Jose, Calif.), and a mobility server 26, which can perform one or more operations associated with a communication leg transfer server. Communication system 10 further includes a business Intranet 30, which is coupled to IP network 14 and which provides connectivity for one or more employees in a business environment.

Communication system 10 also includes a mobile station 28*a*, which may communicate with a remote device through cellular network 12 using base station 18 and/or through IP network 14 using a wireless local area network access point (WLAN AP) 20. Communication system 10 allows for a communication session (e.g. video, voice, data, etc.) to move amongst any number of devices. Mobile station 28*a* represents a wireless telephone in one example and mobile station 28*a* can achieve connectivity via WLAN AP 20, IP network 14, or cellular network 12. Television 28*b* represents a device that is connected to IP network 14 in a residential setting. Desk phone 28*c* represents a fixed device that is wired to a fixed architecture (e.g. an Intranet, the Internet, etc.). Desk phone 28*c* resides in a hosted business environment in this particular example. The elements of communication system 10 can operate to permit end-user devices (e.g. mobile station 28*a*, television 28*b*, business telephone 28*c*, etc.) to maintain a communication session that is transferred between various networks (e.g. cellular network 12 and IP network 14.)

Prior to discussing the following FIGURES, the problems or situations that are being addressed by the proposed flows should be understood. There is an industry consensus that 3GPP's IP multimedia subsystem (IMS) offers the ability to provide ubiquitous access to session initiation protocol (SIP) based multimedia services. While 3GPP has defined the IMS for delivering SIP-based multimedia applications for cellular operators, ETSI-Tispan has recently adopted IMS as the basis for their next generation network architecture. 3GPP IMS roaming architecture is generally based on IMS SIP-based application peering.

In a multi-access environment, while much of the emphasis has been on the recent availability of dual-mode handsets, a mobility solution is needed to accommodate a multi-terminal solution (i.e. providing multi-device flexibility for a given end user). Consider an example in which an end user: 1) starts one or more media sessions via a home television set; 2) switches all or selective components of the media session to a cellular phone as the user moves out of his living room and walks to his car; 3) switches all or selective components of the media session(s) to the in-vehicle communications equipment (e.g. an interactive radio); and 4) drives to work and occasionally switches the media session(s) back to a cellular phone before finally transferring the media session(s) to the end user's enterprise handset when the user enters his office.

A solution to the above scenario (ideally) should involve the use of a make-before-break communication leg management solution. Additionally, such a solution should offer the ability for the home service provider to control the transition between access networks. This is analogous to the mobile assisted handover (MAHO) that is currently specified in cellular systems where the mobile station reports the signal strength of the received neighbor cells to the network and the radio resource management functionality in the network determines when to make a cell transition.

In accordance with the teachings of the present invention, communication system 10 offers an application-based mobility solution that can accommodate decomposed and converged multi-access devices. An application-specific technique is defined to allow mobility server 26, which resides in a given network, to trigger the reporting of signal strength data from a client to the application in the network. An application-specific technique is defined to allow a network-based application server to trigger the reporting of a user's access network preference from a client to the application. An application-specific technique is defined to allow a network-based application server to trigger the reporting of a user's access network preference from a client to the application on a per media component basis.

A signal strength events package is offered by communication system 10 for realizing signal strength and preference data in a multimedia (or a multi-access) environment. A signal strength events package is defined, which allows an application to indicate how measurements and preferences should be reported. Such a package could be SIP-based or based on any other communications platform. The signal strength parameter allows the requested periodicity of measurements to be different when the user agent has established a media session, as opposed to when the user agent has no session established.

The present invention can offer a user interface (defined through the end-user devices), whereby the interface allows a user to interact with the preference information sent within the received signal strength events package. This would, in turn, allow the user to override normal preference data.

Further, said user interface can allow a user to interact with the preference information on a per media component sent within the received signal strength events package. This would, in turn, allow the user to request transfer of only selective components of a multi media session.

Thus, communication system 10 provides a given end user with service continuity as the end user switches access networks. The tendered architecture also positions the core message routing functionality within the network, instead of the client. The operator can readily control the transition between access networks.

In operation of an example embodiment, a multi-access, multimedia capability is offered to provide service continuity as the user switches access mechanisms. A make-before-break approach is used to allow a given end user to establish parallel sessions with the home service provider. One application of such a feature is in a SIP environment, whereby parallel SIP dialogues are established between the subscriber and the home service provider. While such a embodiment uses SIP, the techniques defined are equally applicable to other call control protocols and to other scenarios where a plurality of call control protocols exist (e.g. a combination of signaling connection control part (SCCP) in the enterprise network and SIP in the service provider network).

In this example embodiment, a SIP events package is defined for supporting reports (from a user agent) of the received signal strength measurements towards a third-party call control entity. Mobility server 26 is configured to act as a third-party call control server. Mobility server 26 can receive (e.g. from an IMS S-call session control function (S-CSCF)) a third-party registration whenever a user registers with the S-CSCF. The registration will indicate which SIP events packages are supported by the subscriber's SIP user agent. The registration will also indicate through already standardized techniques the capabilities of the SIP user agent. The reception of this registration triggers mobility server 26 to subscribe to the received signal strength events package of the user.

When a user has a plurality of devices, each will be independently registered with the S-CSCF and be subsequently registered with a SIP-enabled mobility server. The SIP mobility server will subscribe to each SIP user agent received signal strength events package. When a user has a single device comprising a converged access devices (e.g. cellular and WLAN), the converged device may register once with the S-CSCF (in the case that it implements mobile IP) or twice with the S-CSCF (if mobile IP is not implemented). In both cases, both received signal strengths are reported: either in a single notify message (if mobile IP is implemented) or in multiple notify messages (if mobile IP is not implemented).

In the subscription to the received signal strength events package, the SIP mobility server can request the frequency of received signal strength measurements. Furthermore the SIP mobility server can differentiate the requested frequency of reports between when the user agent is active within media session and when it is not (e.g. reporting every 300 seconds when outside a session and every 10 seconds when in-session). Additionally, the SIP mobility server may indicate how the user agent should average received signal strength measurements over the reporting period (e.g. average over the duration of the reporting period).

The SIP notify message is defined to transport the reported signal strengths to the SIP mobility server. The SIP notify message can include a list of one or more standardized techniques for reporting signal strength (e.g. corresponding to the modems supported [for example GSM 05.08 and IEEE 802.11k support]). For each reported technique, the SIP user agent will include one or more signal reports (e.g. RXLEV and RXQUAL for a report corresponding to GSM 05.08). For each reported technique, the user agent can also send a normalized signal strength indication that can be used by mobility server 26, which does not recognize the standardized technique indicated in the notify message. For each reported technique, the user agent will also send a preference indicator for the access network which that was used to generate the received signal strength measurement report. Further, for each reported technique, the user agent can also provide an indication of the type of sessions which can be supported. This may be a subset of those sessions for which the user agent has a capability to support and which have already been reported to mobility server 26 at registration.

In one embodiment, mobility server 26 is a SIP server acting as a back-to-back-user agent (B2BUA) for the duration of the call and the pre-call. During pre-call establishment, mobility server 26 can use the reported received signal strength measurements to determine how to handle the routing of the Invite message. For example, mobility server 26 can use the one or more received signal strength reports to determine whether to forward the Invite to one, both, or neither of the user instances (the latter corresponding to a voice mail type service when the user is out of coverage).

During mid-call, mobility server 26 can use the received signal strength reports to trigger a third-party call control function, which will cause the call leg to be moved from one access leg to another. For example, if a user initiates (or receives) a call when operating purely in the cellular domain, mobility server 26 will route the Invite message to the registered user agent. Then if the user moves into an area of WiFi coverage and has a converged device that is not operating mobile IP, the converged device will first authenticate to the WiFi network and register to the S-CSCF with the IP address allocated by the WiFi network. The S-CSCF can provide third-party registration to mobility server 26, which is currently controlling the users session. Mobility server 26 can then subscribe to the users WiFi received signal strength events package. The converged device can then start reporting WiFi received signal strengths (e.g. including IEEE 802.11k measurement reports of AP signal strength). Mobility server 26 can compare the received signal strength measurements (and possibly reference user preferences) and then, according to business logic, determine when a communication leg transfer should be initiated. Mobility server 26 can then use 3PCC for transferring the call leg from cellular to WLAN.

The home service provider, supporting a plurality of SIP dialogues, is able to receive signal strength measurements corresponding to the access networks that are supporting the individual SIP dialogues. While the above description relates to a converged device, the exact same operation can be used to transfer the legs between access devices. In order for such an implementation to be realized, the user should be authenticated on each access device. While these authentication credentials may be different, it may be the responsibility of the S-CSCF (in one embodiment) together with subscriber database to associate the two authentications to the same subscriber. The S-CSCF, in its third-party registration to mobility server 26, can then include the unique subscriber identity: allowing mobility server 26 to correlate the measurement reports as being associated with the same user. In this way, a dialogue can be successfully moved from one device to another.

In order to force a switch of access devices (for example where automatic switching is not possible), the received signal strength notify message may include preference information, which may be used to force a switch in legs to an alternate access mechanism. This can be the case where the user is consuming content on a television but wants to switch to a cellular phone. Because the television's signal strength reported will always be high quality, such a trigger would not normally occur.

Via user interface interaction (either on the device currently being used or on a device that will be used at a future time), the user can indicate a request to switch legs. This information is included in the preference information within the notify message, which is sent to mobility server 26, where it is used to determine whether the communication leg transfer can occur.

In one embodiment, a preference of 0 on an already established leg may indicate that the user is requesting mobility server 26 to transfer the leg to any other access network as soon as possible. A preference of 255 on a new access network can indicate that the user wants to trigger a transfer of an on-going dialogue from another access network to this access network. Values between 0 and 255 can be used to indicate some user preference for an access network. For example, a value of 128 may indicate no particular user preference for an access network. Additional details related to these features and operations are provided below with reference to FIGS. 2 and 3.

Cellular network 12 represents communications equipment, including hardware and any appropriate controlling logic, for providing wireless telephony services using cellular protocols and technology. Various cellular protocols and technologies may be used by cellular network 12, including but not limited to global system for mobile communications (GSM), time division multiple access (TDMA), code division multiple access (CDMA), and any other appropriate analog or digital cellular protocol or technology. Furthermore, cellular network 12 may utilize signaling system 7 (SS7) protocol for signaling purposes. Cellular network 12 may include any number of base stations 18, as well as base station controllers, mobile switching centers, and other appropriate communications equipment for use in communicating with mobile station 28a and PSTN 16. Thus, as illustrated, cellular network 12 may couple to base station 18 to receive and to transmit wireless signals to and from mobile station 28a.

IP network 14 represents a generic network, which is capable of communicating data using an IP protocol and which can accommodate VoIP. IP network 14 may include communications equipment, including hardware and any appropriate controlling logic, for interconnecting elements included in an Internet environment. Thus, IP network 14 may represent a local area network (LAN), a wide area network (WAN), a metropolitan area network (MAN), and/or any other appropriate network architecture. Furthermore, elements within IP network 14 may utilize circuit-switched and/or packet-based communication protocols to provide for wireline telephony services. In addition, elements within IP network 14 may utilize wireless standards such as the 802.11 family of wireless standards to provide for wireless telephony services. Note that the 802.11 family of wireless standards includes, among others, 802.11a, 802.11b, and 802.11g. IP network 14 may also utilize interactive voice response (IVR). IP network 14 may include any number of wireless network devices 20, gateways 22, Call Managers 24, and other appropriate communications equipment for use in communicating with end-user devices and PSTN 16. In the embodiment illustrated, IP network 14 includes access point 20, gateway 22, Call Manager 24, and mobility server 26. Access point 20 represents communications equipment, including hardware and any appropriate controlling logic, for providing wireless access to IP network 14. Access point 20 may utilize one or more of the 802.11 standards. However, any appropriate wireless standard or protocol may be used.

Gateway 22 represents communications equipment, including hardware and any appropriate controlling logic, for interconnecting IP network 14 with cellular network 12 and/or PSTN 16. Gateway 22 may be used to convert communications between different communication protocols. For example, gateway 22 may convert communications received from cellular network 12 in SS7 protocol to any of various other protocols that may be used by IP network 14, such as protocols associated with the an integrated services digital network (ISDN) standard in the case of circuit-switched trunking and H.323, SIP, or other appropriate protocols in the case of IP-based trunking.

Call Manager 24 represents communications equipment or a communications platform, including hardware and any appropriate controlling logic, for providing telephony services over IP network 14. For example, Call Manager 24 may support VoIP communications, using any of various protocols such as SIP, SCCP protocol, media gateway control protocol (MGCP), H.323, and/or any other appropriate protocol for VoIP. Furthermore, Call Manager 24 may act as an IP PBX and support PBX functions.

Business Intranet 30 represents a virtual private network (VPN) in one embodiment. The VPN serves one or more employees and, further, offers connectivity to any number of devices (e.g. business telephone 28c, personal digital assistants (PDAs), personal computers (PCs), etc.). Business Intranet 30 is coupled to IP network 14 in order to offer additional services and capabilities to a group of end users. In other embodiments, business Intranet 30 is a LAN, WLAN, MAN, WAN, or any other suitable architecture that offers connectivity to a group of end users.

Mobility server 26 represents any appropriate device (e.g. a router, a switch, a bridge, a gateway, a server, etc.) that facilitates the operations detailed herein. Mobility server 26 includes any suitable collection of hardware, software, algorithms, and controlling logic to support a communication leg transfer between networks and to process the signal strength data (and account for user preferences), as further detailed below.

It should be noted that the internal structure of mobility server 26 and end-user devices (e.g. mobile station 28a, television 28b, business telephone 28c, a PDA, a PC, an interactive radio system, any vehicular device [for example an interactive radio], etc.) are malleable and can readily be changed, modified, rearranged, or reconfigured in order to achieve their intended operations as they pertain to the communication leg transfer function, the preference invocation, and the communication of signal strength data. Software and/or hardware may reside in these elements (or in just one) in order to achieve the teachings of the present invention. Hence, software and/or hardware is provided in a given end-user device, which knows how to initiate a preference switch and which autonomously sends signal strength information.

However, due to their flexibility, these elements (mobility server 26 and end-user devices) may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structures of mobility server 26 and end-user devices in the context of communication system 10 and, accordingly, they should be construed as such.

PSTN 16 represents communications equipment, including hardware and any appropriate controlling logic, through which cellular network 12 and IP network 14 may communicate. PSTN 16 may include switches, wireline and wireless communication devices, and any other appropriate equipment for interconnecting cellular network 12 and IP network 14. PSTN 16 may include portions of public and private networks providing network transport services between various geographic areas and networks.

Mobile station 28a represents a mobile device, including hardware and any appropriate controlling logic, capable of communicating with devices through cellular network 12, IP network 14, and business Intranet 30. Mobile station 28a may communicate through cellular network 12 using base station 18 and through IP network 14 using access point 20. Furthermore, mobile station 28a may interact with Call Manager 24 and/or mobility server 26, when appropriate, to trigger a preference or to communicate signal strength information. Television 28b and business telephone 28c may also perform similar operations, as they are equipped in the same fashion. All of these components may be referred to as "end-user devices" as used herein in this document and are inclusive of a myriad of potential elements. Any device that is operable to relay information (voice, video, data, etc.) to the end user should be included in the broad rubric of the term "end-user device."

In operation of one example embodiment involving a cellular telephone, mobile station 28a may initiate and receive telephone calls through cellular network 12 and/or IP network 14 to establish communication sessions. As used herein, a communication session refers to the transfer of voice, video, data, and/or other information between two or more entities. At any point in time, a communication leg transfer decision may be initiated, which could be due to a preference provided in a subscription accessed by mobility server 26. In another example, after establishing a communication session, mobile station 28a may lose or begin to lose connectivity with base station 18 or WLAN access point 20. Signal degradation may occur due to various causes (e.g. mobile station 28a may begin to lose wireless connectivity due to physical movement). When this degradation occurs (and based on end-user preferences) mobility server 26 will coordinate the existing session across multiple devices such that a communication leg transfer is achieved in a seamless fashion.

Other communication leg transfer scenarios may occur when mobile station 28a travels from an area serviced by cellular network 12 to an area serviced by IP network 14, which is illustrated in FIG. 1. Communication leg transfers may also occur in the opposite direction, when mobile station 28a travels from an area serviced by IP network 14 to an area serviced by cellular network 12. However, communication leg transfers may occur at other appropriate times and may involve a period of coexistence of parallel communication legs. For example, handoff may occur when mobile station 28a is located in an area serviced by both network types due to a predetermined preference of one type of network, due to a spontaneous choice of a user of mobile station 28a, or in response to analyzing error rates or other data associated with signaling provided by one or both types of networks. For example, error rates may be associated with signal strengths of base station 18 and access point 20, and may be dependent upon a location of mobile station 28a.

After receiving a telephone call intended for mobile station 28a, Call Manager 24 and/or mobility server 26 may include itself in a signaling path associated with the resulting communication session, whether the signaling path proceeds through cellular network 12 or IP network 14.

Note that communication system 10 represents only one embodiment of a system that supports communication session transfer between cellular, IP, hosted, enterprise, and wireless networks. Various alternative embodiments are possible. For example, while in the illustrated embodiment IP network 14 couples to cellular network 12 through PSTN 16 using gateway 22, various other embodiments may include IP network 14 coupling to cellular network 12 in other ways. For example, IP network 14 may couple to cellular network 12 using a service provider that supports VoIP. Thus, in alternative embodiments, cellular network 12 and gateway 22 may not be included in communication system 10.

Figure 2:
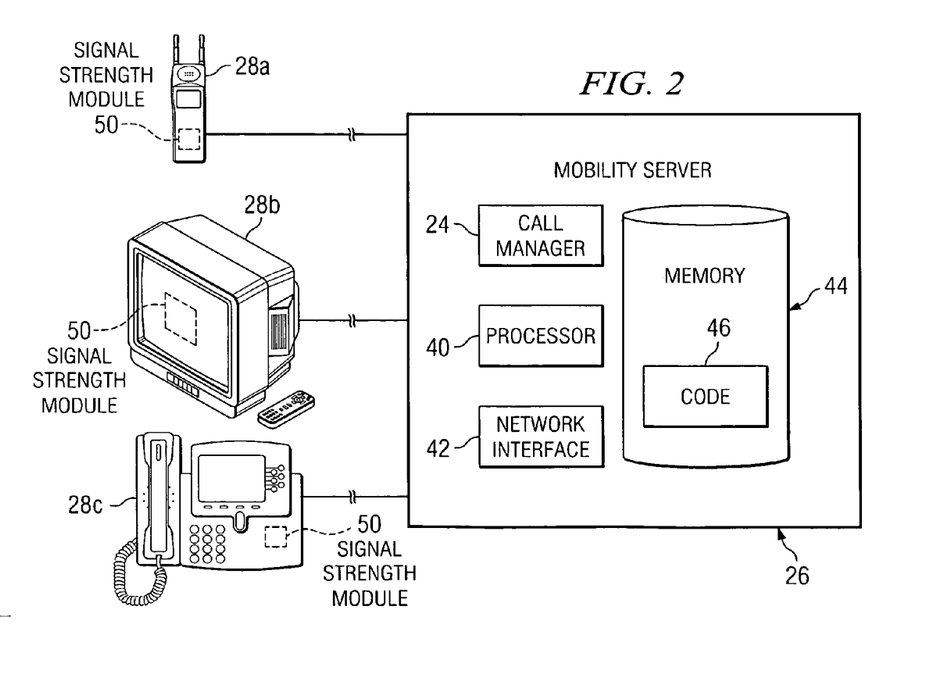
FIG. 2 is a block diagram illustrating functional components of a mobility server and a set of end-user devices from the communication system.

FIG. 2 is a block diagram illustrating functional components of mobility server 26 and several end-user devices. In the embodiment illustrated, mobility server 26 includes Call Manager 24, as well as a processor 40, a network interface 42, and a memory 44. Each end-user device includes a signal strength module 50 in this particular embodiment. Signal strength module 50 can generate signals that propagate to mobility server 26. Collectively, these functional elements can operate to support a communication leg transfer of active communication sessions. These elements can also facilitate the signal strength and preference features, as outlined herein in this document.

In operation of an example embodiment, mobility server 26 uses a SIP received signal strength events package to provide application mobility. Mobility server 26 can determine how to route SIP Invite messages and mid-call leg transfers. Processor 40 controls the operation and administration of elements within mobility server 26. For example, processor 40 operates to process information received from network interface 42 and memory 44. Processor 40 includes any hardware and/or logic elements operable to control and process information. For example, processor 40 may be a programmable logic device, a microcontroller, a microprocessor, and/or any other suitable processing device.

Network interface 42 communicates information to (and receives information from) devices coupled to IP network 14. For example, network interface 42 may communicate with gateway 22, Call Manager 24, and access point 20. Additionally, the signal strength reporting can reside in a proxy user agent. For example, a call terminating on a VoIP gateway may be able to generate signal strength reports according to the real-time protocol (RTP) jitter and packet error ratios observed on the link. Furthermore, network interface 42 may receive information from (and transmit information to) remote devices, as well as end-user devices. Thus, network interface 42 includes any suitable hardware or controlling logic used to communicate information to or from elements coupled to mobility server 26.

Memory 44 stores, either permanently or temporarily, data and other information for processing by processor 40 and communication using network interface 42. Memory 44 includes any one or a combination of volatile or nonvolatile local or remote devices suitable for storing information. For example, memory 44 may include random access memory (RAM), read only memory (ROM), magnetic storage devices, optical storage devices, or any other suitable information storage device or a combination of these devices. As illustrated, memory 44 may include one or more memory modules, such as code 46, and, further include information relating to user preferences and/or user subscriptions.

Code 46 includes software, executable files, and/or appropriate logic modules capable when executed to control the operation of mobility server 26. For example, code 46 may include executable files capable of supporting communication leg management and signal strength processing. Code 46 may also include instructions to enable mobility server 26 to utilize any number of mobile features.

Note that mobility server 26 may use any appropriate protocol to communicate with other elements of communication system 10. For example, mobility server 26 may utilize Java telephony application programming interface (JTAPI) to interact with Call Manager 24.

While this example includes specific functional components for mobility server 26 and end-user devices, these elements may include any collection and arrangement of components, including some or all of the enumerated functional components, for supporting signal strength processing and user preference invocation. Moreover, mobility server 26 contemplates implementing each of the functional components using any suitable combination and arrangement of hardware and/or logic, and implementing any of the functionalities using a computer program stored on a computer-readable medium. Furthermore, mobility server 26 may be implemented as a stand-alone device, or aspects of mobility server 26 may be distributed among various devices within IP network 14. Alternatively, in some embodiments, mobility server 26 may be incorporated into Call Manager 24.

Figure 3:
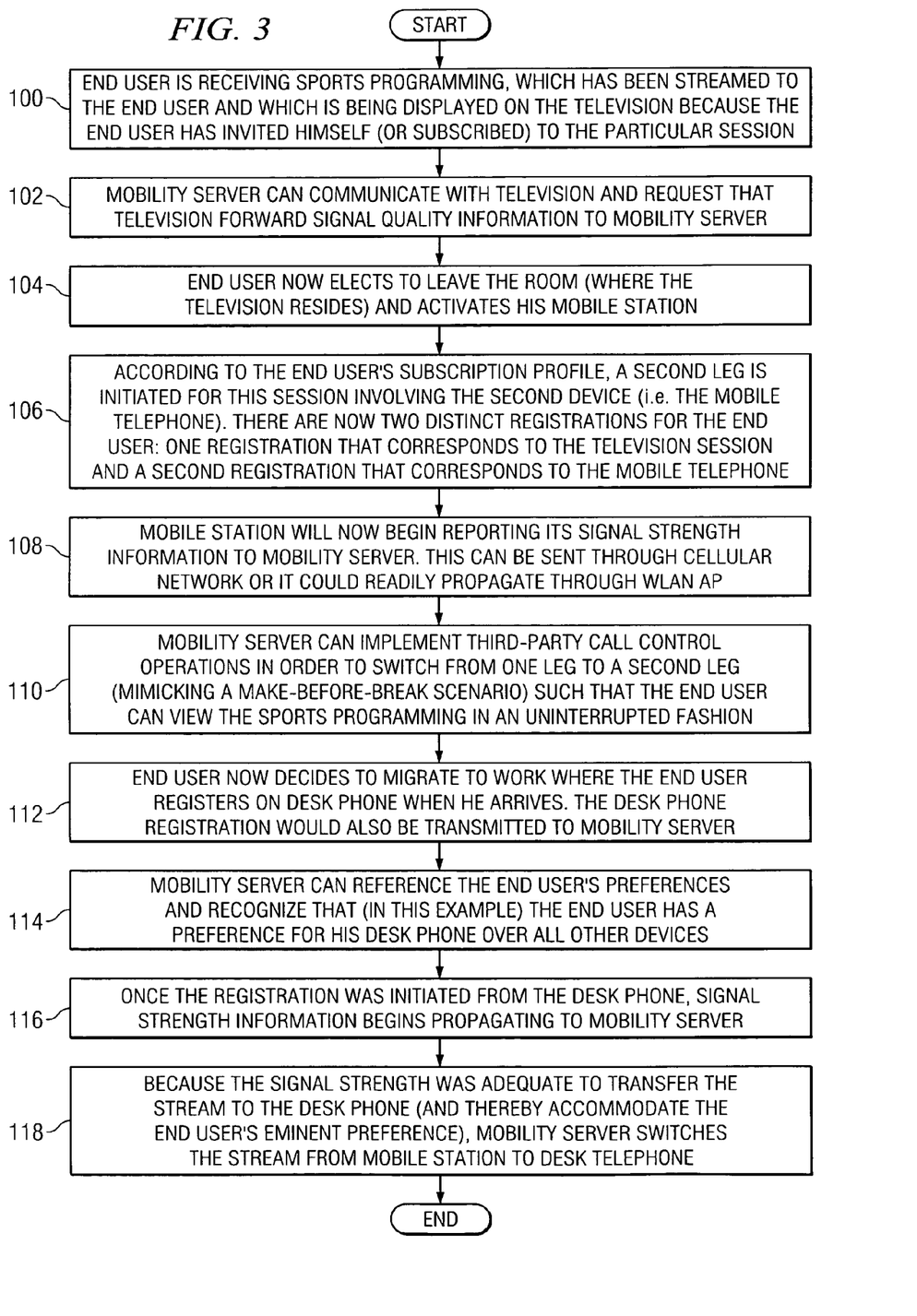
FIG. 3 is a simplified flowchart associated with a method for providing connectivity support in the communication system.

Turning now to FIG. 3, FIG. 3 is a simplified flowchart associated with a method for providing seamless connectivity across multiple devices in communication system 10. In operation of an example flow, consider a scenario where a given end user has a relationship with Comcast Cable Television. The end user is receiving video and audio sports programming, which has been streamed to the end user and which is being displayed on the television because the end user has invited himself (or subscribed) to the particular session. This is illustrated by step 100. The session is being displayed by a given device, such as television 28b (or an Internet-enabled display, etc.). Thus, a SIP session is occurring and is being facilitated by a SIP proxy (not shown) that has established the session. In this scenario, Comcast Cable Television (particularly the SIP proxy) has recognized that this particular end user has a mobility capability. A third-party registration is thus sent to mobility server 26 to inform it when the user has first registered. Furthermore, the SIP proxy has been configured (e.g., due to subscription preferences) to route session establishments through mobility server 26 to allow the mobility server to function as a back-to-back user agent (B2BUA).

Following session establishment, mobility server 26 can communicate with television 28b and request that television 28b forward signal quality information to mobility server 26.

This is illustrated by step 102. In this example, because a simple television architecture with wireline connectivity is present, signal quality or signal strength is not necessarily an issue. In other scenarios that involve WLAN AP 20, the signal strength could be less certain (e.g. due to interference).

The end user now elects to leave the room (where the television resides) and activates his mobile station 28a at step 104. In this example, mobile station 28a is video-enabled such that the end user can continue to receive the audio and video sports programming on his mobile telephone. The activation of mobile station 28a will trigger a registration with Comcast Cable Television (particularly the SIP proxy). This SIP proxy has recognized that this particular end user has a mobility capability. A third-party registration is thus sent to mobility server 26 to inform it that the user has registered now over the cellular network. This registration can also include the capabilities of the user agent (e.g., in this case that the mobile station is equipped to receive audio and video streaming). There are now two distinct registrations for the end user: one registration that corresponds to the television session and a second registration that corresponds to the mobile telephone, as is indicated by step 106. Both registrations can be managed and coordinated by mobility server 26. Note that some business cooperation would exist between the cable provider and the cellular provider to achieve this transitioning.

In a similar fashion to that described above, mobile station 28a will now begin reporting its signal strength information to mobility server 26 at step 108. This can be sent through cellular network 12 or it could readily propagate through WLAN AP 20 in other embodiments. Thus, when the end user is ready to make this switch in devices, he can interact with a registered device, either his phone or Internet-enabled television, whereby a simple notify message is sent to mobility server 26 indicating that the user now has a preference for receiving both streams on the new device. Mobility server 26 can implement third-party call control operations in order to switch from one leg to a second leg (mimicking a make-before-break scenario) such that the end user can continue to receive the video and audio streams of the sports programming in an uninterrupted fashion, as illustrated by step 110.

Note the mobile telephone may be WLAN-enabled, in addition to being readily accommodated by cellular network 12, such that there may be two independent registrations (e.g. one IP address for cellular network 12 and one IP address derived from WLAN AP 20). Therefore, signal strength may be reported from both networks. In this example, the end user roams into a "hot spot" that is covered by WLAN AP 20. Based on his subscription, which is maintained (or accessible) by mobility server 26, a preference for hot spot connectivity is identified in the subscription. When the end user comes within range of the hot spot, a session is initiated and propagates through the hot spot. This switch over is autonomous, as it can automatically switch over based on user preferences. Mobility server 26 would transfer the stream from the cellular environment to the WLAN architecture.

Continuing with this example, the end user now decides to migrate to work at step 112. The business phone resides in a hosted environment. The end user registers on desk phone 28c when he arrives at work. The desk phone registration would also propagate to the same SIP agent that was highlighted above and, similarly, a third party registration would then be transmitted to mobility server 26. Mobility server 26 acknowledges this subsequent registration. In addition, mobility server 26 can reference the end user's preferences and recognizes that (in this example) the end user has a preference for his desk phone over all other devices, as evidenced by step 114. Once the registration was initiated from the desk phone, signal strength information begins propagating to mobility server 26. This is illustrated by step 116. Because the signal strength was adequate to transfer the stream to the desk phone (and thereby accommodate the end user's eminent preference), mobility server 26 switches the stream from mobile station 28a to desk phone 28c. This is illustrated by step 118.

Note that during each of these transitions, user agent capabilities can be considered such that session make-up can be altered. Hence, capabilities associated with video, voice, and text can be evaluated in the course of executing these switchovers. For example, the original video broadcast from television 28b may have been dropped when the stream moved to mobile station 28a, but then the video stream was able to resume once the end user arrived at work and registered with his desk phone 28c.

In this fashion, the present invention can accommodate sessions or streams using any number of devices, which may or may not have certain capabilities. Note that "mobility" is generally thought of as device-centric in most systems. The present invention surpasses such boundaries in offering a flexible solution that offers seamless transitions between devices while the session remains relatively unchanged (i.e. in a seamless fashion). In one sense, mobility is redefined to be user-centric, which is far more adaptable to the user's specific needs. By employing such an architecture, the user is no longer confined to a single device and can, instead, just indicate his preference for a given device or environment.

This achieves mobility across devices, whereby signal strength is constantly being relayed to a single point. Note that, ordinarily, signal strength information would propagate to multiple pieces of equipment and not be consolidated in such an efficient manner, as outlined herein. The present invention offers a mobile-assisted handoff scenario, which is in contrast to a mobile-initiated arrangement of other architectures.

Thus, the present invention allows the routing decision to be between different devices with a means for indicating the required change of device by the user. Furthermore, the invention supports heterogeneous deployments of SIP-based control of circuit switched bearers, which is being standardized by 3GPP.

Note that while the preceding examples include specific functional components for end-user devices, end-user devices may include any collection and arrangement of components, including some or all of the enumerated functional components, for communicating using cellular network 12, business Intranet 30, and/or IP network 14 in effecting seamless handoffs between devices. The preceding discussions illustrate particular methods for effecting optimal call leg management and for providing appropriate signal strength support. However, these discussions illustrate only exemplary methods of operation. Additionally, many of the steps in the discussions may take place simultaneously and/or in different orders than as shown. In addition, the devices may use methods with additional steps or fewer steps, so long as the methods remain appropriate. Moreover, other equipment of communication system 10 may perform similar techniques to achieve signal strength support and communication leg transfer between various networks.

It is critical to note that the stages and steps in the FIGURES illustrate only some of the possible scenarios and operations that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure (e.g. GGSNs, SGSNs, a POTS, etc.), and any other appropriate software, hardware, or data storage objects may be included within communication system 10 to effectuate the tasks and operations of the elements and activities associated with- executing seamless communication leg transfer across multiple end-user devices.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention: such alternatives and substitutions being clearly within the broad scope of communication system 10. For example, the use of gateway 22 could be supplanted by bridges, switches, routers or any other suitable devices that are conducive to network communications. Additionally, it should also be noted that such an architecture is compatible with access solutions that do not use IP for transporting end-to-end voice transport (where a combinational service is created, which uses SIP for signaling but legacy circuit switched technology for optimized voice transport across a cellular network, e.g., 3GPP 23.899 logic).

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. An apparatus for providing connectivity across multiple devices, comprising:
    a first end-user device configured to:
        facilitate a communication session that may be transferred from a first end-user device, the first end-user device being associated with a first call leg and the second end-user device being associated with a second call leg, the second end-user device having a preference; and
        transmit a signal strength of the second end-user device to a mobility server in accordance with a Session Initiation Protocol (SIP) signal strength events package of the second end-user device subscribed to by the mobility server, the mobility server configured to determine that the signal strength can satisfy the preference, and, in response to the determination and independent of a user request to transfer, automatically transfer the communication session from the first call leg to the second call leg to hand the communication session from the first end-user device to the second end-user device;
    wherein the mobility server is operable to elect whether to execute the communication leg transfer based on a comparison of signal strength information received from the first and second end-user devices.

2. The apparatus of claim 1, wherein the communication leg transfer occurs due to an end user preference that is provided in a subscription.

3. The apparatus of claim 1, wherein the handoff occurs due an end user request.

4. The apparatus of claim 1, wherein the first end-user device and the second end-user device each include their own separate registrations.

5. The apparatus of claim 1, wherein the second end-user device is a selected one of a group of end-user devices, the group consisting of:
    a) a mobile station;
    b) a television;
    c) a laptop computer;
    d) a personal computer;
    e) an interactive radio;
    f) a VoIP telephone; and
    g) a personal digital assistant.

6. The apparatus of claim 1, wherein preference information is provided to transfer only one out of a plurality of communication sessions between the devices.

7. The apparatus of claim 1, wherein the communication leg transfer may include a period of bi-casting a plurality of communication sessions to the first end-user device and the second end-user device.

8. An apparatus for providing connectivity across multiple devices, comprising:
    a mobility server configured to:
        receive a first registration that allows for a communication session for a first end-user device, the first end-user device being associated with a first call leg;
        receive a second registration that allows for the communication session for a second end-user device, the second end-user device being associated with a second call leg;
        receive a preference provided by a user subscription, the preference indicating a preference of the second end-user device;
        subscribe to a Session Initiation Protocol (SIP) signal strength events package of the second end-user device;
        receive a signal strength of the second end-user device in accordance with the SIP signal strength events package;
        determine that the signal strength of the second end-user device can satisfy the preference; and
        in response to the determination and independent of a user request to transfer, automatically transfer the communication session from the first call leg to the second call leg to hand the communication session from the first end-user device to the second end-user device;
    wherein the mobility server is operable to elect whether to execute the communication leg transfer based on a comparison of signal strength information received from the first and second end-user devices.

9. The apparatus of claim 8, wherein the handoff is executed based on an end-user preference that is provided in the user subscription that is accessed by the mobility server.

10. The apparatus of claim 8, wherein the handoff is executed based on an end-user request.

11. The apparatus of claim 10, wherein the end-user request is provided by the first end-user device.

12. The apparatus of claim 10, wherein the end-user request is provided by the second end-user device.

13. The apparatus of claim 8, wherein mobility server is operable request a frequency of received signal strength measurements.

14. The apparatus of claim 13, wherein the frequency of received signal strength measurements requested is independently set for when the end-user device has a communication session active or when the end-user device has no communication session active.

15. The apparatus of claim 8, wherein the mobility server is operable to elect whether to bi-cast a communication leg simultaneously to the first and second end-user devices based on a comparison of signal strength information received from the first and second end-user devices.

16. A method for providing connectivity across multiple devices, comprising:
    receiving, at a mobility server, a first registration that allows for a communication session for a first end-user device, the first end-user device being associated with a first call leg;
    receiving a second registration that allows for the communication session for a second end-user device, the second end-user device being associated with a second call leg;
    receiving a preference provided by a user subscription, the preference indicating a preference of the second end-user device;
    subscribing, by the mobility server, to a Session Initiation Protocol (SIP) signal strength events package of the second end-user device;
    receiving, at the mobility server, a signal strength of the second end-user device in accordance with the SIP signal strength events package;
    determining, by the mobility server, that the signal strength of the second end-user device cam satisfy the preference; and
    in response to the determination and independent of a user request to transfer, automatically transferring, by the mobility server, the communication session from the first call leg to the second call leg to hand the communication session from the first end-user device to the second end-user device;
    wherein the mobility server is operable to elect whether to execute the communication leg transfer based on a comparison of signal strength information received from the first and second end-user devices.

17. The method of claim 16, further comprising:
    accessing a user subscription that includes an end-user preference for either the first or the second end-user device, wherein the handoff is executed based on the end-user preference.

18. The method of claim 16, further comprising:
    electing whether to execute the handoff based on a comparison of signal strength information received from the first and second end-user devices.

19. The method of claim 18, further comprising:
    requesting a frequency of received signal strength measurements.

20. The method of claim 19, wherein the frequency of received signal strength measurements requested is independently set for when the end-user device has a communication session active or when the end-user device has no communication session active.

21. The method of claim 16, wherein preference information is provided to transfer only one out of a plurality of communication sessions between the devices.

22. The method of claim 16, wherein the communication leg transfer may include a period of bi-casting a plurality of communication sessions to the first end-user device and the second end-user device.

23. The method of claim 16, wherein the handoff is executed based on an end-user request.

24. The method of claim 23, wherein the end user request is provided by the first end-user device.

25. The method of claim 23, wherein the end user request is provided by the second end-user device.

26. Software for providing connectivity across multiple devices, the software being embodied in a computer readable medium and comprising computer code such that when executed is operable to:
    receive, at a mobility server, a first registration that allows for a communication session for a first end-user device, the first end-user device being associated with a first call leg;
    receive a second registration that allows for the communication session for a second end-user device, the second end-user device being associated with a second call leg;
    receive a preference provided by a user subscription, the preference indicating a preference of the second end-user device;
    subscribe, by the mobility server, to a Session Initiation Protocol (SIP) signal strength events package of the second end-user device;
    receive, at the mobility server, a signal strength of the second end-user device in accordance with the SIP signal strength events package;
    determine, by the mobility server, that a signal strength of the second end-user device can satisfy the preference; and
    in response to the determination and independent of a user request to transfer, automatically transfer, by the mobility server, the communication session from the first call leg to the second call leg to hand the communication session from the first end-user device to the second end-user device;
    wherein the mobility server is operable to elect whether to execute the communication leg transfer based on a comparison of signal strength information received from the first and second end-user devices.

27. The medium of claim 26, wherein the code is further operable to:
    access a user subscription that includes an end-user preference for either the first or the second end-user device, wherein the handoff is executed based on the end-user preference.

28. The medium of claim 26, wherein the code is further operable to:
    elect whether to execute the handoff based on a comparison of signal strength information received from the first and second end-user devices.

29. A system for providing connectivity across multiple devices, comprising:
    means for receiving, at a mobility server, a first registration that allows for a communication session for a first and a second end-user device the first end-user device being associated with a first call leg;
    means for receiving a second registration that allows for the communication session for the second end-user device, the second end-user device being associated with a second call leg;
    means for receiving a preference provided by a user subscription, the preference indicating a preference of the second end-user device;

means for subscribing to a Session Initiation Protocol (SIP) signal strength events package of the second end-user device;

means for receiving a signal strength of the second end-user device in accordance with the SIP signal strength events package;

means for determining, by the mobility server, that a signal strength of the second end-user device can satisfy the preference; and means for, in response to the determination and independent of a user request to transfer, automatically transferring, by the mobility server, the communication session from the first call leg to the second call leg to hand the communication session from the first end-user device to the second end-user device;

wherein the mobility server is operable to elect whether to execute the communication leg transfer based on a comparison of signal strength information received from the first and second end-user devices.

30. The system of claim 29, further comprising:

means for accessing a user subscription that includes an end-user preference for either the first or the second end-user device, wherein the handoff is executed based on the end-user preference.

31. The system of claim 29, further comprising:

means for electing whether to execute the handoff based on a comparison of signal strength information received from the first and second end-user devices.

* * * * *

UNITED STATES PATENT AND TRADEMARK OFFICE
CERTIFICATE OF CORRECTION

PATENT NO. : 7,650,143 B2 Page 1 of 1
APPLICATION NO. : 11/128046
DATED : January 19, 2010
INVENTOR(S) : Jagadeesan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 364 days.

Signed and Sealed this

Twenty-third Day of November, 2010

David J. Kappos
*Director of the United States Patent and Trademark Office*